United States Patent
Wang et al.

(10) Patent No.: US 9,414,183 B2
(45) Date of Patent: Aug. 9, 2016

(54) METHOD AND APPARATUS FOR PROVIDING GROUP CONTEXT SENSING AND INFERENCE

(75) Inventors: Wei Wang, Beijing (CN); Huanhuan Cao, Beijing (CN); Jilei Tian, Beijing (CN); Xia Wang, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/375,415

(22) PCT Filed: Mar. 20, 2012

(86) PCT No.: PCT/CN2012/072653
§ 371 (c)(1),
(2), (4) Date: Jul. 29, 2014

(87) PCT Pub. No.: WO2013/138999
PCT Pub. Date: Sep. 26, 2013

(65) Prior Publication Data
US 2015/0004958 A1    Jan. 1, 2015

(51) Int. Cl.
H04W 4/00 (2009.01)
H04W 8/24 (2009.01)
H04W 4/02 (2009.01)
H04W 4/08 (2009.01)

(52) U.S. Cl.
CPC ........... *H04W 4/006* (2013.01); *H04W 4/02* (2013.01); *H04W 4/08* (2013.01); *H04W 8/24* (2013.01)

(58) Field of Classification Search
None
See application file for complete search history.

(56) References Cited

U.S. PATENT DOCUMENTS

| | | | | |
|---|---|---|---|---|
| 2006/0156307 A1* | 7/2006 | Kunjithapatham | ... | G06F 9/4843 718/103 |
| 2006/0240856 A1* | 10/2006 | Counts | ... | H04W 4/08 455/518 |
| 2007/0299796 A1* | 12/2007 | Macbeth | ... | G06W 10/10 706/16 |

(Continued)

FOREIGN PATENT DOCUMENTS

| | | |
|---|---|---|
| CN | 101006742 | 7/2007 |
| CN | 101621738 | 1/2010 |

(Continued)

OTHER PUBLICATIONS

Korpipaa, Panu; Mantyjarvi, Jani; Kela, Juha; Keranen, Heikki; Malm, Esko-Juhani, Managing Context Information in Mobile Devices; Pervasive Comuting, IEEE, vol. 2, Issue 3, Jul. 2003, pp. 42-51.*

(Continued)

*Primary Examiner* — Kimberly A Williams
(74) *Attorney, Agent, or Firm* — Ditthavong & Steiner, P.C.

(57) ABSTRACT

An approach is provided for providing group context sensing and inference. The group context platform determines at least one group of one or more devices that have one or more group contexts that are at least substantially similar, at least substantially correlated, or a combination thereof. Next, the group context platform causes, at least in part, a distribution of one or more context sensing tasks among the one or more devices of the at least one group. Then, the group context platform processes and/or facilitates a processing of one or more results of the one or more context sensing tasks to (a) modify the one or more group contexts; (b) enhance the one or more group contexts; (c) determine one or more other group contexts; or (d) a combination thereof.

20 Claims, 12 Drawing Sheets

(56) References Cited

U.S. PATENT DOCUMENTS

| | | | |
|---|---|---|---|
| 2012/0077521 A1* | 3/2012 | Boldyrev | H04W 4/043 455/456.3 |
| 2012/0123988 A1* | 5/2012 | Kim | G06N 5/04 706/46 |
| 2012/0224711 A1* | 9/2012 | Kim | H04L 67/18 381/77 |
| 2013/0012220 A1* | 1/2013 | Waris | H04L 12/12 455/450 |
| 2013/0095865 A1* | 4/2013 | Roets | H04L 51/20 455/466 |
| 2013/0185359 A1* | 7/2013 | Liu | H04L 67/24 709/204 |
| 2013/0252597 A1* | 9/2013 | Jin | H04W 4/04 455/418 |
| 2015/0004956 A1* | 1/2015 | Aksamit | H04W 4/025 455/418 |

FOREIGN PATENT DOCUMENTS

| | | | |
|---|---|---|---|
| CN | 101662492 | 3/2010 | |
| FI | WO 2011116709 A1 * | 9/2011 | H04L 12/12 |

OTHER PUBLICATIONS

International Search Report received for corresponding Patent Cooperation Treaty Application No. PCT/CN2012/072653 dated Jan. 3, 2013, 3 pages.

* cited by examiner

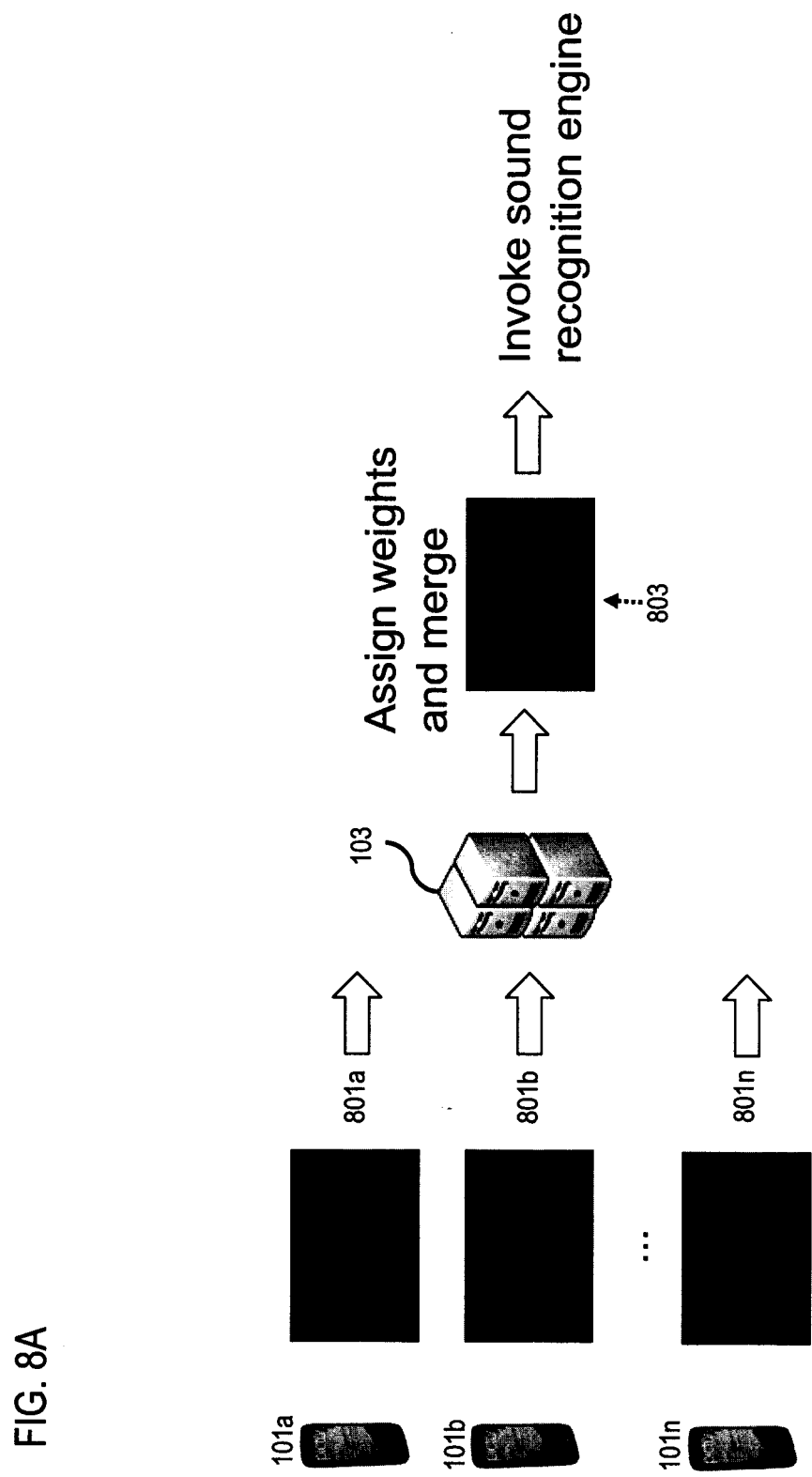

METHOD AND APPARATUS FOR PROVIDING GROUP CONTEXT SENSING AND INFERENCE

RELATED APPLICATION

This application was originally filed as PCT Application No. PCT/CN2012/072653 filed on Mar. 20, 2012.

BACKGROUND

Service providers and device manufacturers (e.g., wireless, cellular, etc.) are continually challenged to deliver value and convenience to consumers by, for example, providing compelling network services. One area of interest has been the development of context-aware services. For example, in recent years, mobile devices equipped with context sensors have enabled service providers to offer intelligent and personalized services and content based on the sensed context. Nonetheless, there are many circumstances in which a mobile device cannot accurately model context using its own context sensors (e.g., the mobile device is inadequately equipped with context sensors, there is interference with available context sensors of the mobile device, etc.). Moreover, even when a mobile device can accurately model its context using its own context sensors, it may not be efficient for the mobile device to only rely on its context sensors for context data.

SOME EXAMPLE EMBODIMENTS

Therefore, there is a need for an approach for group context sensing and inference.

According to one embodiment, a method comprises determining at least one group of one or more devices that have one or more group contexts that are at least substantially similar, at least substantially correlated, or a combination thereof. The method also comprises causing, at least in part, a distribution of one or more context sensing tasks among the one or more devices of the at least one group. The method further comprises processing and/or facilitating a processing of one or more results of the one or more context sensing tasks to (a) modify the one or more group contexts; (b) enhance the one or more group contexts; (c) determine one or more other group contexts; or (d) a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine at least one group of one or more devices that have one or more group contexts that are at least substantially similar, at least substantially correlated, or a combination thereof. The apparatus is also caused to cause, at least in part, a distribution of one or more context sensing tasks among the one or more devices of the at least one group. The apparatus is further caused to process and/or facilitate a processing of one or more results of the one or more context sensing tasks to (a) modify the one or more group contexts; (b) enhance the one or more group contexts; (c) determine one or more other group contexts; or (d) a combination thereof.

According to another embodiment, a computer-readable storage medium carries one or more sequences of one or more instructions which, when executed by one or more processors, cause, at least in part, an apparatus to determine at least one group of one or more devices that have one or more group contexts that are at least substantially similar, at least substantially correlated, or a combination thereof. The apparatus is also caused to cause, at least in part, a distribution of one or more context sensing tasks among the one or more devices of the at least one group. The apparatus is further caused to process and/or facilitate a processing of one or more results of the one or more context sensing tasks to (a) modify the one or more group contexts; (b) enhance the one or more group contexts; (c) determine one or more other group contexts; or (d) a combination thereof.

According to another embodiment, an apparatus comprises means for determining at least one group of one or more devices that have one or more group contexts that are at least substantially similar, at least substantially correlated, or a combination thereof. The apparatus also comprises means for causing, at least in part, a distribution of one or more context sensing tasks among the one or more devices of the at least one group. The apparatus further comprises means for processing and/or facilitating a processing of one or more results of the one or more context sensing tasks to (a) modify the one or more group contexts; (b) enhance the one or more group contexts; (c) determine one or more other group contexts; or (d) a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-26 and 45-47.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A and 8B are diagrams respectively illustrating merging and voting approaches to handling results of context sensing tasks, according to one embodiment;

DESCRIPTION OF SOME EMBODIMENTS

Examples of a method, apparatus, and computer program for providing group context sensing and inference are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
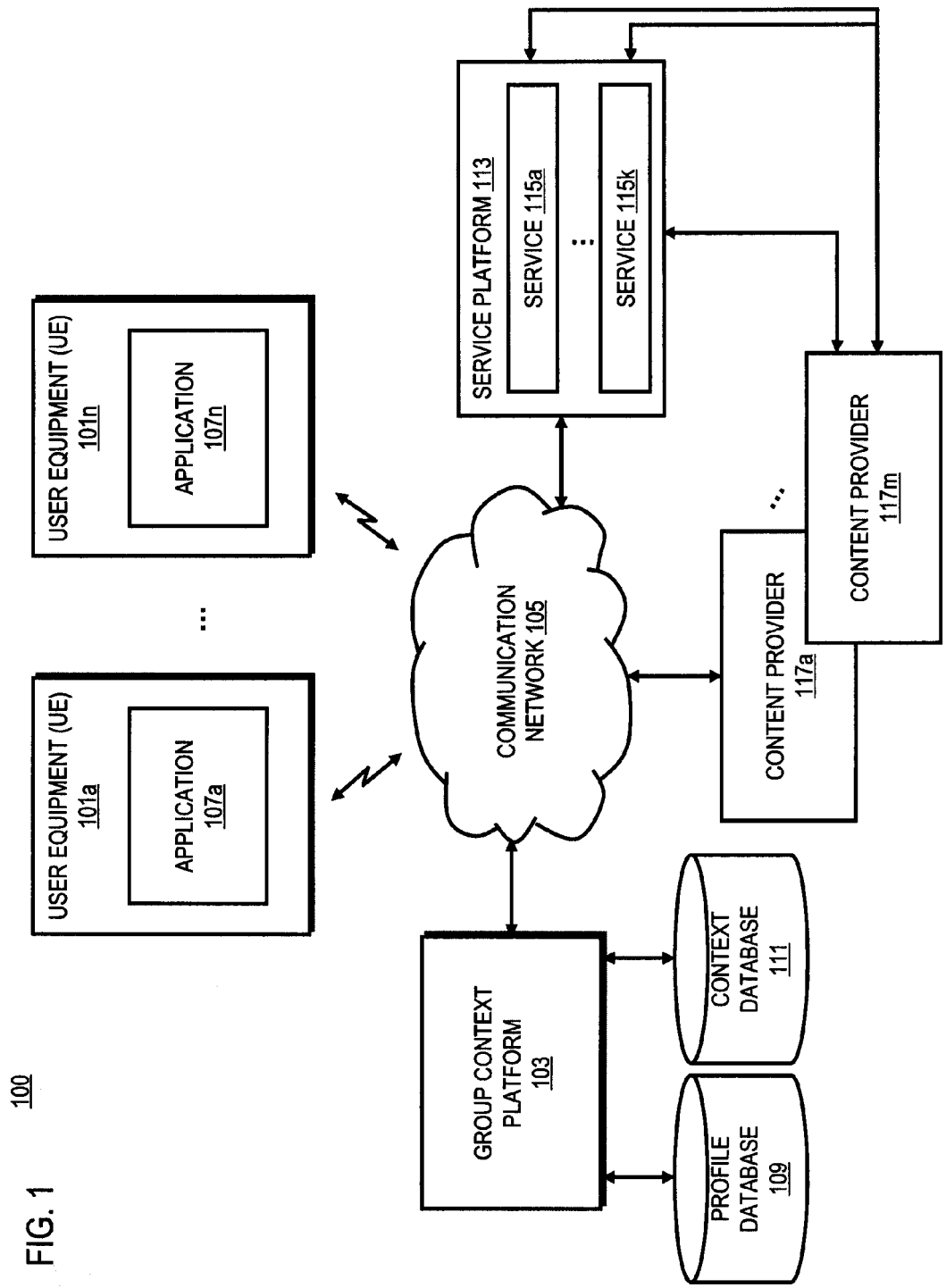
FIG. 1 is a diagram of a system capable of providing group context sensing and inference, according to one embodiment.

FIG. 1 is a diagram of a system capable of providing group context sensing and inference, according to one embodiment. As indicated, in recent years, context sensing technologies have enabled intelligent and personalized services and content based on the sensed context. For example, a mobile device equipped with context sensors (e.g., Global Positioning System (GPS) sensors, accelerometers, light detectors, microphones, etc.) allow the mobile device to capture context data associated with the environment that its user is in. The captured context data may then be analyzed, for instance, to determine activities that the user is engaged in, the user's current location, other users that the user is interacting with, etc. Nonetheless, there are many situations in which a mobile device cannot accurately model context using its own context sensors. Such scenarios may, for instance, include: (1) a lack of hardware (e.g., GPS sensors, accelerometers, light detectors, microphones, etc.) necessary for adequate context sensing; (2) insufficient resources (e.g., due to low battery life, overutilization of processing resources, etc.) of the mobile device for continued context sensing; and (3) interference with the context sensors of the mobile device (e.g., a light detector of a device in a user's pocket cannot accurately detect ambient light surrounding the user's environment). Furthermore, it may not be efficient for the mobile device to only rely on its context sensors for its context even when the mobile device can accurately model its context using its own context sensors. Constant use of a mobile device of all of its context sensors may, for instance, drain the battery life of the mobile device, overutilize the processor and the memory of the mobile device, increase data costs for the user of the mobile device, etc.

To address this problem, a system 100 of FIG. 1 introduces the capability to provide group context sensing and inference. Specifically, the system 100 may determine a group of devices that have substantially similar and/or substantially correlated group contexts; cause a distribution of context sensing tasks among the devices of the group; and process results of the context sensing tasks to modify the group contexts, enhance the group contexts, determine other group contexts, etc. By way of example, some of the context sensing tasks may be heterogeneous context sensing tasks. As used herein, the term "heterogeneous" refers to diversity of the context sensing tasks. Thus, the distribution of the context sensing tasks may, for instance, include a number of different types of context sensing tasks to enable collaborative and complementary context sensing (e.g., context data results from different types of context sensors of various devices may complement each other to provide more accurate sensing and inference). In one scenario, several users may be traveling on the road in a single car, and each of those users may be carrying a mobile device (e.g., mobile phone, tablet, etc.). After an initial determination that the mobile devices in the car have group contexts that are substantially similar and/or substantially correlated, the mobile devices (and/or the users) may automatically be identified as being part of the same group. By way of example, the mobile devices may be determined to be in close proximity of each other based on initial context data obtained from short-range wireless sensors (e.g., Bluetooth, wireless fidelity (WiFi), near-field communication (NFC), etc.) of some of the mobile devices, and GPS sensors on some of the other mobile devices. Moreover, the mobile devices may be determined to be in close proximity of each other based on audio samples collected by at least some of the microphones of the mobile devices (e.g., voices of the users, music being played in the car, etc.).

Based on the identification of the group, one of those mobile devices that have a GPS sensor may be distributed the task of collecting GPS data for the group (e.g., since any sample from the group may be sufficient for relatively accurate location data), all of the mobile devices that have an accelerometer may be distributed the task of collecting acceleration data for the group (e.g., to assist in GPS navigation and predictions), and a majority of the mobile devices that have a microphone may be distributed the task of recording conversations among the users of the group along with other audio for the group. In response to the context sensing tasks, the mobile devices may respectively provide context data collected from their various context sensors. As such, the context data may then be processed to determine the group's current location, the group's predicted location, that the group is traveling in a car, etc. In addition, such information may be presented to the users on their individual mobile devices, for instance, to inform them of their current statuses (e.g., "You are currently in City X. You are predicted to be in City Y in two hours."). In this way, users with mobile devices in the group that are not equipped with certain context sensors may still benefit from the other users with mobile devices equipped with such context sensors (e.g., a user with a mobile device that is not equipped with an accelerometer may still benefit from someone in the same group with a mobile device equipped with an accelerometer). Moreover, group context sensing and inference enable more efficient use of device resources. In this case, for instance, only one of the mobile devices in the group was required to utilize resources (e.g., battery power, processor and memory utilization, etc.) for collecting GPS data, while the other mobile devices in the group could save their resources for other purposes. Furthermore, the group approach enriches the amount and types of available context data that may, for instance, be used to provide personalized and intelligent services and content.

In certain embodiments, group context sensing and inference may further be optimized by considering the internal and external conditions of group devices, and context data requirements. For illustrative purposes, an exemplary example of a rule-based approach is provided in Table 1 below:

TABLE 1

| Location |
| --- |
| 1. Requirement: Any sample in the group is sufficient.<br>2. Policy: Determine all devices in the group that have a GPS signal, and select the device with the highest battery power to collect the location data. |
| Accelerometer |
| 1. Requirement: Determine the status of the majority of people in the group.<br>2. Policy: Let all devices in the group report accelerometer data. |
| Ambient Light |
| 1. Requirement: Any sample in the group is sufficient.<br>2. Policy: Randomly select a device from the group to report ambient light data. |
| Ambient Sound |
| 1. Requirement: Record conversations among people in the group.<br>2. Policy: Let all devices in the group report ambient sound data. |

As shown in FIG. 1, the system 100 comprises a user equipment (UE) 101 (or multiple UEs 101a-101n) having connectivity to a group context platform 103 via a communication network 105. The UE 101 may include or have access to an application 107 (e.g., applications 107a-107n) to enable the UE 101 to interact with, for instance, the group context platform 103, which may: (1) determine a group of devices that have substantially similar and/or substantially correlated group contexts; (2) cause distribution of context sensing tasks among the devices of the group; (3) process results of the context sensing tasks to modify the group contexts, enhance the group contexts, and/or determine other group contexts; (4) process initial context data associated with the devices to determine the group and/or the group contexts for determining the group; (5) process the group contexts, the modified group contexts, the enhanced group contexts, and/or the other group contexts to determine inferred context data for a subset of the devices that lack access to context sensors for obtaining such context data; (6) determine resource information and/or performance information associated with the devices; (7) process the group contexts, the modified group contexts, the enhanced group contexts, and/or the other group contexts to determine activity information relating to the group and/or the devices; (8) determine social relationships among users of the devices; (9) or perform other functions.

In various embodiments, the group context platform 103 may include or have access to a profile database 109 to access or store resource information, performance information, etc., associated with the devices. Resource information may, for instance, include: data with respect to the context sensors that are available to the various devices (e.g., which devices have certain types of context sensors, what is the quality associated with the various context sensors of those devices, etc.); data relating to data plans available to those devices and the costs associated with such data plans; and data regarding other resources currently available to those devices (e.g., current status of processing and memory utilization, battery life, etc.). Performance information may include: data with respect to efficiency associated with use of the context sensors on the various devices; data relating to accuracy of context data obtained from those devices; data regarding delay associated with obtaining context data from those devices; and other performance-related data. The group context platform 103 may also include or have access to a context database 111 to access or store context data for the group of devices, history information relating to previous group contexts, etc. Data stored in the profile database 109 and the context database 111 may, for instance, be provided by the devices (e.g., UEs 101), a service platform 113, one or more services 115 (or services 115a-115k), one or more content providers 117 (or content providers 117a-117m), and/or other services available over the communication network 105. For example, a certain service 115 may provide some resource information with respect to the devices, and the devices (e.g., UEs 101) may supply updated resource information along with data relating to its performance. It is noted that the group context platform 103 may be a separate entity of the system 100, a part of the one or more services 115 of the service platform 113, or included within the UE 101 (e.g., as part of the application 107).

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the group context platform 103 may process and/or facilitate a processing of initial context data associated with the one or more devices to determine the at least one group, the one or more group contexts for determining the at least one group, or a combination thereof. As indicated, initial context data may dynamically be collected by a number of devices to determine various common contexts among those devices. Based on the common contexts, the group context platform 103 may, for instance, identify at least one group that includes a subset (e.g., the one or more devices) of those devices, wherein the devices of the subset have one or more common contexts with each other. In one use case, there may be users in a first building located in City X, and users in a second building located in City Y. As an example, two users, Larry and Sergey, in the first building may be having a teleconference with two other users, Bill and Steve, in the second building. Based on location data and ambient sound data (e.g., their voice and conversation during the teleconference) collected by their respective devices (e.g., their mobile phones), the group context platform 103 may determine that Larry, Sergey, Bill, and Steve are in a group based on their substantially similar and highly correlated ambient sound data despite their location differences.

In another embodiment, the group context platform 103 may process and/or facilitate a processing of the one or more group contexts, the one or more modified group contexts, the one or more enhanced group contexts, the one or more other group contexts, or a combination thereof to determine inferred context data for at least some of the one or more devices. In one scenario, a number of users (and their devices) determined to be in the same group may be traveling on a charter bus. As such, one of the devices may be distributed the task of collecting GPS data, another device may be distributed the task of collecting acceleration data, and a third device with a temperature sensor may be distributed the task of collecting temperature data. In response to the distribution of the context sensing tasks, the devices may respectively transmit the GPS data, the acceleration data, and the temperature data to the group context platform 103. The group context platform 103 may then process such data with previously determined context data (e.g., initial context data, group contexts, etc.) to determine inferred context data for the devices that did not collect GPS data, for the devices that did not collect acceleration data, and for the devices that did not collect temperature data. Thus, devices that do not utilize resources to collect certain types of context data using their context sensors may still benefit from the inferred context data based on the collection of those certain types of context data by other devices. Accordingly, those unused resources may be utilized for other purposes.

In a further embodiment, the inferred context data may be associated with one or more context sensors that are not available to the at least some of the one or more devices. By way of example, the at least some devices may be those devices without a GPS sensor, an accelerometer, a temperature sensor, etc. As such, the at least some devices benefits from group context sensing and inference since context data collected by context sensors (that are not available to the at least some devices) of other devices may be utilized to infer context data for the at least some devices. In one use case, Sam may buy an inexpensive mobile device with basic hardware and sensors which do not include GPS sensors, light detectors, or accelerometers. On a bus trip, however, Sam may still receive location-based services based on his mobile device's inferred context data determined from location data collected by the GPS sensors of other devices on the bus. In this way, even devices that are not equipped with advanced and/or expensive context sensors may obtain intelligent and personalized services based on rich context data.

In another embodiment, the group context platform 103 may determine resource information, performance information, or a combination thereof associated with the one or more devices, wherein the distribution of the one or more context sensing tasks is based, at least in part, on the resource information, the performance information, or a combination thereof. In a further embodiment, the group context platform 103 may cause, at least in part, an assignment of at least one of the one or more context sensing tasks to at least one of the one or more devices, another assignment of at least another one of the one or more context sensing tasks to at least another one of the one or more devices, or a combination thereof based, at least in part on, the resource information, the performance information, or a combination thereof, wherein the distribution of the one or more context sensing tasks is further based, at least in part, on the assignment, the other assignment, or a combination thereof.

In one use case, there may be ten devices determined to be in the same group based on their substantially similar and highly correlated group contexts (e.g., close-proximity, same voices in the environment, etc.). Using information received from those devices, the group context platform 103 may, for instance, determine that devices 1-9 are equipped with cameras, devices 1-6 are equipped with GPS sensors, and all of the devices are equipped with microphones. Thus, based on such a determination, the group context platform 103 may only assign image/video collection tasks to devices 1-9 and GPS data collection tasks to devices 1-6. However, the group context platform 103 may also determine that devices 1-4 are low on battery life. As such, the group context platform 103 may only assign image/video collection tasks to devices 5-9, GPS data collection tasks to devices 5 and 6, and audio recording tasks to devices 5-10. In a further scenario, the group context platform 103 may determine that device 10 is inefficient with respect to audio recording (e.g., the audio recording application of device 10 utilizes an inefficient algorithm that utilizes more processing resources than necessary). As a result, the group context platform 103 may not assign any audio recording tasks to device 10. Consequently, the group context platform 103 may distribute the various context sensing tasks to the devices in the group based on the assignments.

In another embodiment, the group context platform 103 may process and/or facilitate a processing of the one or more group contexts, the one or more modified group contexts, the one or more enhanced group contexts, the one or more other group contexts, or a combination thereof to determine activity information relating to the at least one group, the one or more devices, or a combination thereof. By way of example, Charlie may be sitting in a restaurant waiting for Alice. Since Charlie is inside the restaurant, his mobile phone may not be able to accurately detect that Charlie is currently located inside the restaurant. As such, his mobile phone may only be able to detect that Charlie is "indoors" since the current context data from his mobile phone can only accurately provide such level of detail. However, when Alice arrives and they start to discuss what they would like to have for dinner, their voices are collected by their individual phones, and combined to form a conversation. The group context platform 103 may perform an audio analysis on the conversation, which may result in the detection of keywords, such as "menu," "order," and "chicken" in the conversation. As a result, the group context platform 103 may recognize that Charlie and Alice are "in a restaurant for dinner," and display the activity information on both of Charlie's and Alice's phones.

In another scenario, Sam may be determined to be part of a particular group of "bus riders" while riding a bus during a shopping trip. Similarly, Julie and Jason, who are travelling on the same bus during the same time, may also be determined to be in the same group (e.g., based on their devices). Based on their collective group contexts (e.g., from location data, ambient sound data, etc.), the activity information displayed on their devices may, for instance, be "Riding on a Bus to Go Shopping in City X." In a further scenario, Sam, Julie, and Jason may have a history of "Riding on a Bus to Go Shopping in City X" along with a history of being identified as being part of the group performing the particular activity (e.g., Sam, Julie, and Jason are frequently together when performing this activity, but they may not know it). Based on this history, the group context platform 103 may inform Sam, Julie, and Jason of their history with each other and suggest that they become "friends" on their social networks. Thus, group activity information may be used to build social relationships. In other situations, group activity information may also be utilized to enhance and/or modify current social relationships.

In another embodiment, the group context platform 103 may cause, at least in part, a presentation of one or more notifications, one or more recommendations, or a combination thereof for the at least one group, the one or more devices, or a combination thereof based, at least in part, on the activity information. As indicated, if the group context platform 103 determines that Charlie and Alice are "in a restaurant for dinner" based on the inferred group contexts (e.g., determined from the group contexts, the modified group contexts, the enhanced group contexts, and/or the other group contexts), such activity information may be presented on both Charlie's and Alice's phone (e.g., "You are in a restaurant for dinner" may be presented on both phones). Additionally, or alternatively, Charlie's and Alice's phones may present them with recommendations relating to the activity information, such as dinner recommendations, advertisements related to after-dinner events, etc.

In another embodiment, the group context platform 103 may process and/or facilitate a processing of quality information associated with the one or more results to determine one or more weights of the one or more results. In a further embodiment, the group context platform 103 may cause, at least in part, a merging of the one or more results based, at least in part, on the one or more weights and one or more types associated with the one or more results, wherein the one or more modified group contexts, the one or more enhanced group contexts, the one or more other group contexts, or a combination thereof are further based, at least in part, on the merging of the one or more results. As an example, the same type of context data collected from multiple users in a user group (e.g., from multiple devices in the group) can be assembled to infer their common activities with higher precision. With respect to ambient sound, the group context platform 103 may, for instance, determine an overall, enhanced sound signal by merging all received sound signals based on various weights associated with each of the sound signals. As indicated, a weight may be determined for a particular sound signal according to the quality of the sound signal. The enhanced sound signal may then be utilized for inferring context data for the group.

In another embodiment, the group context platform 103 may determine voting information for the one or more results based, at least in part, on one or more types associated with the one or more results, wherein the one or more modified group contexts, the one or more enhanced group contexts, the one or more other group contexts, or a combination thereof are further based, at least in part, on the voting information. In one scenario, Bob is having a meeting with his colleagues. Based on previous group contexts, Bob's phone may correctly display that Bob "is in a meeting." During the meeting, Bob may stand up and walk over to the whiteboard to draw a figure. Although Bob's acceleration (e.g., detected by his mobile device) alters his current individual context, and, thus, indicates a change to his current activity, the activity information on Bob's mobile device may still be displayed as "in a meeting" since the context data (e.g., with respect to acceleration and movement) of a majority of members in the group may remain substantially unchanged (e.g., the other members in the group are still sitting down in the meeting room). Specifically, the group context platform 103 may, for instance, acknowledge Bob's change in acceleration and movement as one vote for suggesting a modification to the group context, and that the other member's substantially unchanged accelerations and movements as votes advocating that the group context with respect to acceleration and movement should remain substantially unchanged. Thus, the overwhelming number of votes to keep the group context with respect to acceleration and movement override the vote by Bob's mobile device. In a further scenario, Bob may stay in the room to organize the meeting minutes when the meeting is over, while the other members may leave the room. Although Bob's mobile device may determine that his individual context data has remained substantially the same, his mobile device may nevertheless display "available" as opposed to "in a meeting" since the other members of the group have left the room (e.g., the meeting may be determined to be dismissed, Bob and the other members may no longer be identified as being part of the "meeting" group, etc.).

In another embodiment, the group context platform 103 may determine one or more social relationships among one or more users of the one or more devices, wherein the one or more modified group contexts, the one or more enhanced group contexts, the one or more other group contexts, or a combination thereof are further based, at least in part, on the one or more social relationships. By way of example, if users of the group (e.g., the owners of the devices of the group) refer to their relationships with each other as "co-workers," a gathering of those users in a room may suggest a business meeting, event, etc. On the other hand, if users of the group refer to their relationships with each other as "friends," a gathering of those users in a room may suggest a social event, a party, etc.

In another embodiment, the group context platform 103 may determine to request feedback information relating to the at least one group from the one or more devices, wherein the determination of the at least one group is based, at least in part, on the feedback information. By way of example, the group context platform 103 may that all group identifications satisfy a certain level (e.g., a pre-set level) of accuracy, confidence, etc. If, for instance, the accuracy or confidence level with respect to a particular identification of a group of devices has not yet been met, the group context platform 103 may send a notification to each of the identified group users (e.g., via the devices of the identified group) asking them to confirm that they are in the identified group. If a user does not believe that he/she is part of the identified group, the user may provide feedback to indicate that he/she (and, thus, his/her device) is not part of the identified group. By way of another example, users may provide feedback to the group context platform 103 via their devices to indicate that they are part of the same group. Thus, the group context platform 103 may utilize such feedback along with other information (e.g., initial context data) for group identifications.

By way of example, the UE 101, the group context platform 103, the service platform 113, the services 115, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
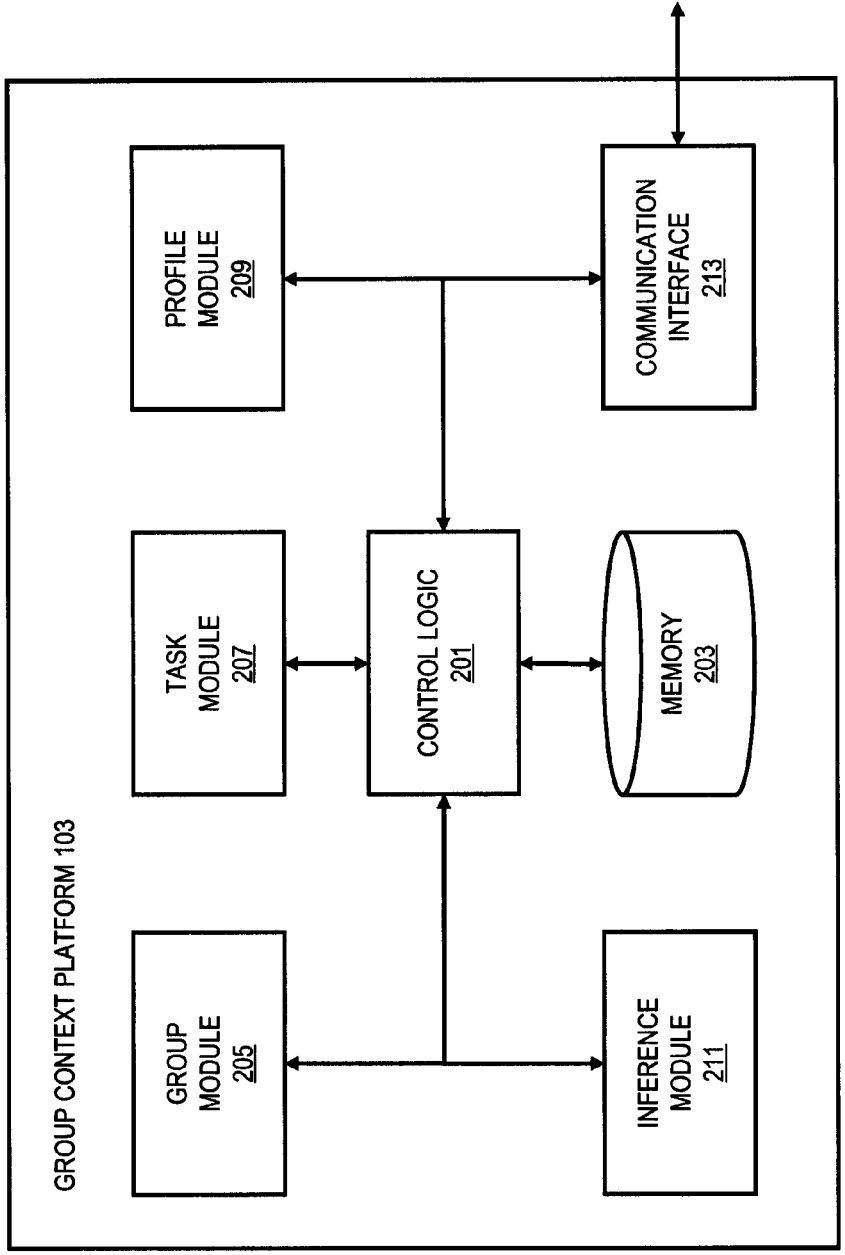
FIG. 2 is a diagram of the components of a group context platform, according to one embodiment.

FIG. 2 is a diagram of the components of a group context platform, according to one embodiment. By way of example, the group context platform 103 includes one or more components for providing group context sensing and inference. It is contemplated that the functions of these components may be combined in one or more components or performed by other components of equivalent functionality. In this embodiment, the group context platform 103 includes control logic 201, memory 203, a group module 205, a task module 207, a profile module 209, an inference module 211, and a communication interface 213.

The control logic 201 executes at least one algorithm for executing functions of the group context platform 103. For example, the control logic 201 may interact with the group module 205 to determine a group of devices that have group contexts that are substantially similar and/or substantially correlated. As indicated, initial context data associated with the devices may, for instance, be collected and processed to determine the group, the group contexts for determining the group, etc. Upon determining the group, the control logic 201 may direct the task module 207 to distribute context sensing tasks (e.g., a set of heterogeneous context sensing tasks) to the devices of the group.

In some embodiments, the task module 207 may work with the profile module 209 to determine resource information, performance information, etc., associated with the devices of the group. By way of example, resource information may include: data with respect to the context sensors that are available to the various devices (e.g., which devices have certain types of context sensors, what is the quality associated with the various context sensors of those devices, etc.); data relating to data plans available to those devices and the costs associated with such data plans; and data regarding other resources currently available to those devices (e.g., current status of processing and memory utilization, battery life, etc.). Performance information may include: data with respect to efficiency associated with use of the context sensors on the various devices; data relating to accuracy of context data obtained from those devices; data regarding delay associated with obtaining context data from those devices; and other performance-related data. The task module 207 may then, for instance, assign the context sensing tasks (e.g., a task related to one type of context data to one device of the group, another task related to another type of context data to another device of the group, etc.) based on the resource information, the performance information, etc. As such, the distribution of the context sensing tasks may be based on the various assignments.

The control logic 201 may also interact with the inference module 211 to process results of the context sensing tasks to modify the group contexts, enhance the group contexts, determine other group contexts, etc. As mentioned, the group contexts, the enhanced group contexts, the other group contexts, etc., may then be processed to determine inferred context data for at least some of the devices of the group. In certain embodiments, the inferred context data may be associated with one or more context sensors that are not available to the at least some of the one or more devices. In this way, devices that are not equipped with certain types of context sensors (e.g., advanced and/or expensive context sensors) may still benefit from context data collected by devices equipped with those certain types of context sensors. Moreover, because of group context sensing and inference, even devices equipped with such context sensors may not need to utilize those context sensors if, for instance, there is already sufficient context data associated with such context sensors being collected by other devices. Accordingly, all types of devices (and their users) may benefit from group context sensing and inference.

The control logic 201 may additionally utilize the communication interface 213 to communicate with other components of the group context platform 103, the UEs 101 (e.g., the device, the other devices, etc.), the service platform 113, the services 115, the content providers 117, and other components of the system 100. For example, the communication interface 213 may be utilized to initiate distribution of context sensing tasks the respective UEs WI based on their identified groups. The communication interface 213 may further include multiple means of communication. In one use case, the communication interface 213 may be able to communicate over short message service (SMS), multimedia messaging service (MMS), internet protocol, email, instant messaging, voice sessions (e.g., via a phone network), or other types of communication.

Figure 3:
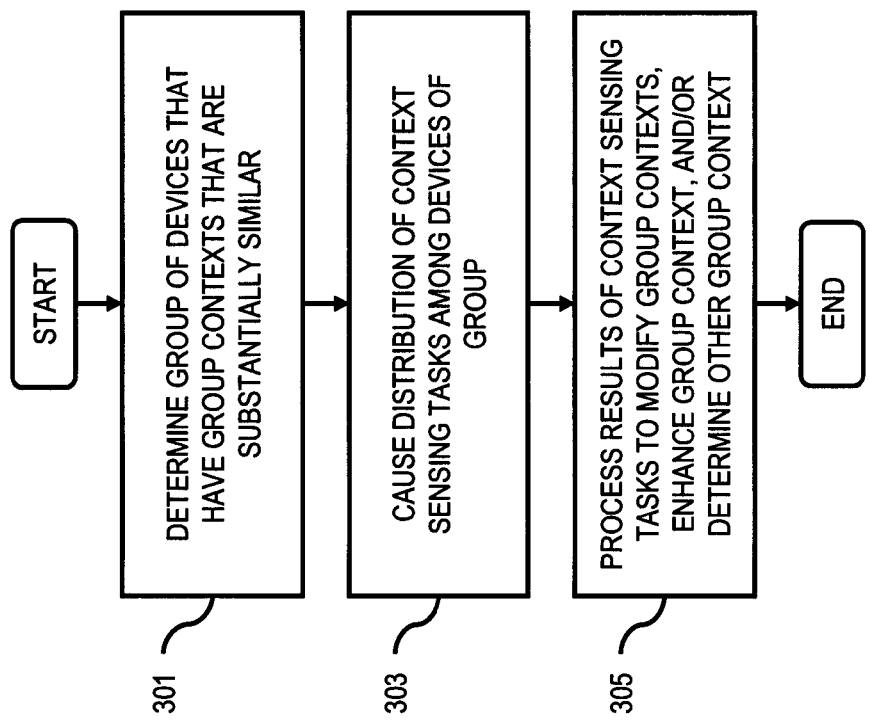
FIG. 3 is a flowchart of a process for providing group context sensing and inference, according to one embodiment.
Figure 10:
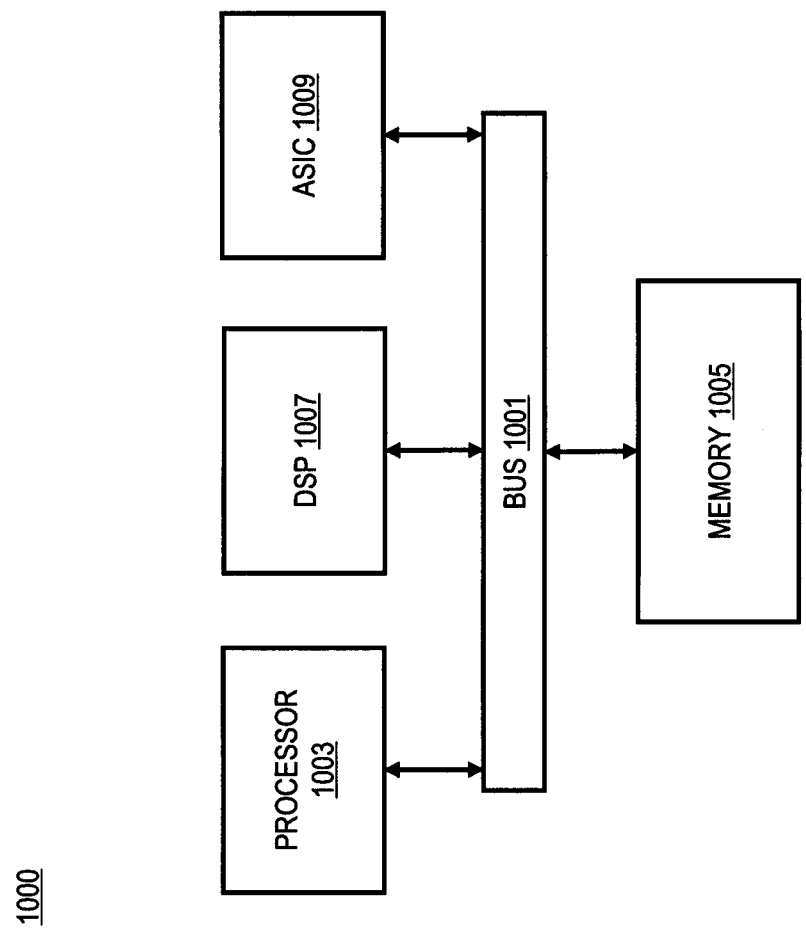
FIG. 10 is a diagram of a chip set that can be used to implement an embodiment of the invention.

FIG. 3 is a flowchart of a process for providing group context sensing and inference, according to one embodiment. In one embodiment, the group context platform 103 performs the process 300 and is implemented in, for instance, a chip set including a processor and a memory as shown in FIG. 10. As such, the control logic 201 can provide means for accomplishing various parts of the process 300 as well as means for accomplishing other processes in conjunction with other components of the group context platform 103.

In step 301, the control logic 201 may determine at least one group of one or more devices that have one or more group contexts that are at least substantially similar, at least substantially correlated, or a combination thereof. In some embodiments, the control logic 201 may process and/or facilitate a processing of initial context data associated with the one or more devices to determine the at least one group, the one or more group contexts for determining the at least one group, or a combination thereof. By way of example, initial context data may be collected from all available devices to determine a group that includes a subset of those available devices, wherein the subset of devices have common contexts with each other (e.g., substantially similar location, detected voices, ambient light, etc.).

In step 303, the control logic 201 may cause, at least in part, a distribution of one or more context sensing tasks (e.g., a set of heterogeneous context sensing tasks) among the one or more devices of the at least one group. In response, the one or more devices may, for instance, provide one or more results of their respective context sensing tasks (e.g., context data associated with their respective, distributed tasks). As such, the control logic 201 may, at step 305, process and/or facilitate a processing of one or more results of the one or more context sensing tasks to (a) modify the one or more group contexts; (b) enhance the one or more group contexts; (c) determine one or more other group contexts; or (d) a combination thereof.

Figure 4:
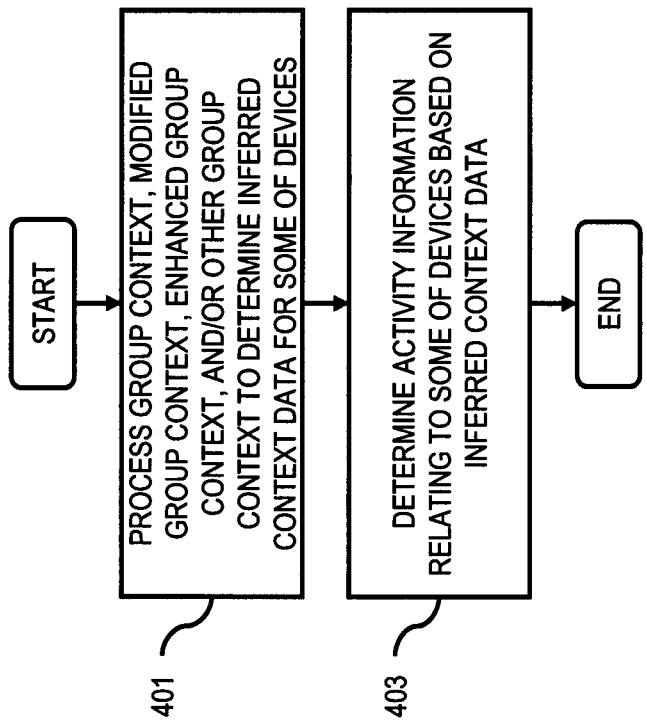
FIG. 4 is a flowchart of a process for determining inferred context data based on group context sensing and inference, according to one embodiment.

FIG. 4 is a flowchart of a process for determining inferred context data based on group context sensing and inference, according to one embodiment. In one embodiment, the group context platform 103 performs the process 400 and is implemented in, for instance, a chip set including a processor and a memory as shown in FIG. 10. As such, the control logic 201 can provide means for accomplishing various parts of the process 400 as well as means for accomplishing other processes in conjunction with other components of the group context platform 103.

In step 401, the control logic 201 may process and/or facilitate a processing of the one or more group contexts, the one or more modified group contexts, the one or more enhanced group contexts, the one or more other group contexts, or a combination thereof to determine inferred context data for at least some of the one or more devices. The control logic 201 may then, at step 403, determine activity information relating to the at least some of the one or more devices based, at least in part, on the inferred context data. As discussed, in certain embodiments, the inferred context data may be associated with one or more context sensors that are not available to the at least some of the one or more devices.

By way of example, Jessie and James may among numerous users on a tour bus traveling throughout City X. Although other users on the tour bus may have mobile phones with advanced and expensive context sensors, Jessie and James may only have cheap, smart phones with very basic context sensors which do not include GPS sensors, light detectors, accelerometers, etc. Nonetheless, after Jessie and James (e.g., via their cheap, smart phones), and the other users (e.g., via their advanced phones) are determined to be part of the "tour bus" group, the context data from the other users' devices may be used to determine various group contexts for the "tour bus" group. The various group contexts may then be processed to determine inferred context data (e.g., location data, ambient light data, acceleration data, etc.) for Jessie, James, and their respective cheap devices. Upon such determination, their cheap devices may thereafter present them with the current activity information of the group (e.g., "Riding on a Tour Bus in City X: Current at Street Y") along with other personalized services and content relating to the group activity information. Thus, even though Jessie and James do not have devices equipped with advanced or expensive context sensors, they can benefit from the context sensors of the other users in their identified group.

Figure 5:
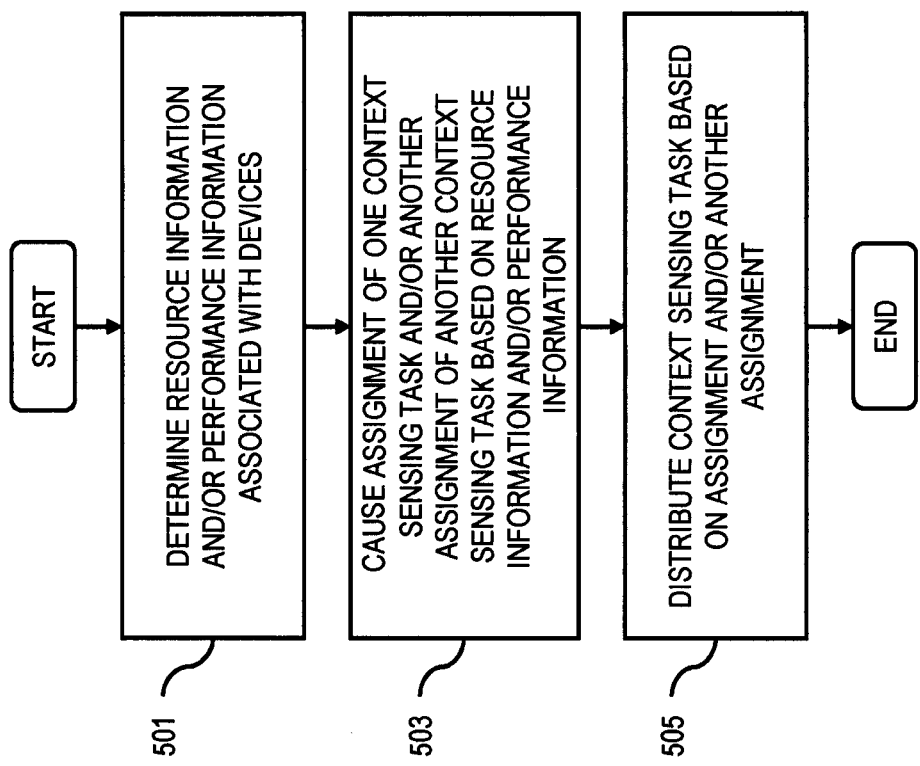
FIG. 5 is a flowchart of a process for distributing context sensing tasks, according to one embodiment.

FIG. 5 is a flowchart of a process for distributing context sensing tasks, according to one embodiment. In one embodiment, the group context platform 103 performs the process 500 and is implemented in, for instance, a chip set including a processor and a memory as shown in FIG. 10. As such, the control logic 201 can provide means for accomplishing various parts of the process 500 as well as means for accomplishing other processes in conjunction with other components of the group context platform 103.

In step 501, the control logic 201 may determine resource information, performance information, or a combination thereof associated with the one or more devices. By way of example, resource information may include: data with respect to the context sensors that are available to the various devices (e.g., which devices have certain types of context sensors, what is the quality associated with the various context sensors of those devices, etc.); data relating to data plans available to those devices and the costs associated with such data plans; and data regarding other resources currently available to those devices (e.g., current status of processing and memory utilization, battery life, etc.). Performance information may include: data with respect to efficiency associated with use of the context sensors on the various devices; data relating to accuracy of context data obtained from those devices; data regarding delay associated with obtaining context data from those devices; and other performance-related data.

In step 503, the control logic 201 may cause, at least in part, an assignment of at least one of the one or more context sensing tasks to at least one of the one or more devices, another assignment of at least another one of the one or more context sensing tasks to at least another one of the one or more devices, or a combination thereof based, at least in part on, the resource information, the performance information, or a combination thereof. The control logic 201 may then, at step 505, cause, at least in part, a distribution of one or more context sensing tasks among the one or more devices of the at least one group based, at least in part, on the assignment and/or the other assignment. In one scenario, a first device in an identified group of devices may be assigned and distributed a context sensing task of collecting GPS data if, for instance, the first device is determined to be equipped with GPS sensors (e.g., that currently have a GPS signal). On the other hand, the first device may not be assigned or distributed a context sensing task of collecting ambient light data if the first device is not equipped with a light detector. Nonetheless, the context sensing task relating to ambient light may be assigned and distributed to a second device in the group that is equipped with a light detector. Moreover, the task of collecting GPS data may not be assigned to the first device if, for instance, the first device is determined to be low on battery life, or if the first device is determined to be very inefficient at collecting GPS data. Consequently, in such a situation, the task of collecting GPS data may be assigned and distributed to another device in the group that is equipped with GPS sensors. In this way, group context sensing and inference allow for effective and efficient collection of context data.

Figure 6A:
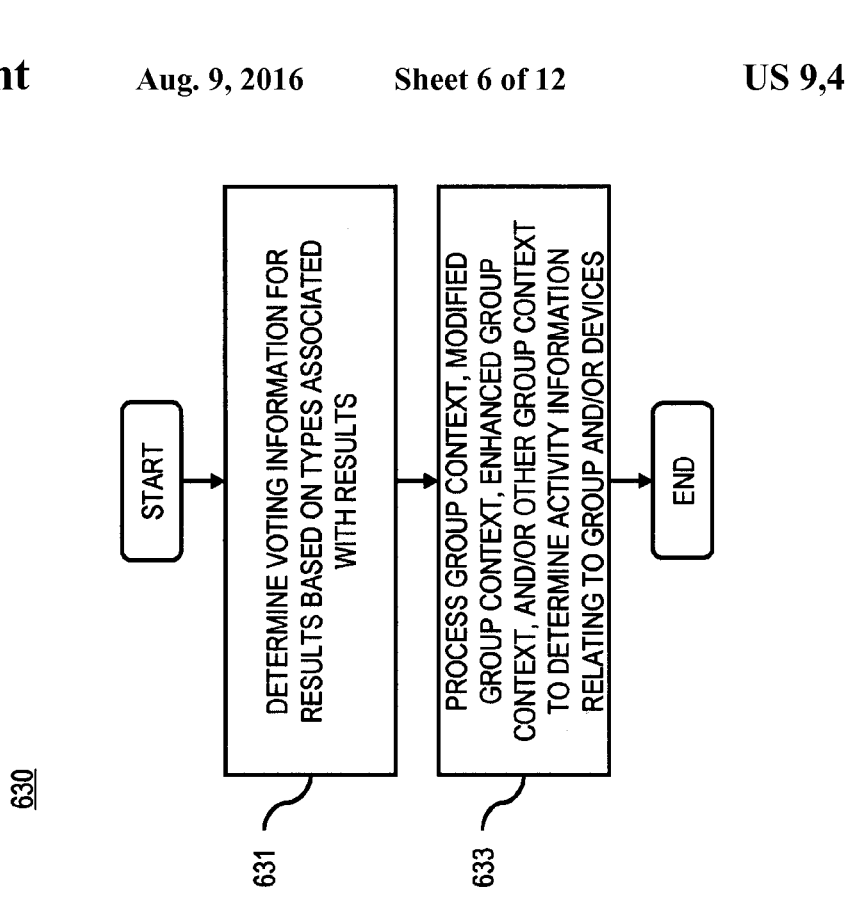
FIGS. 6A and 6B are flowcharts of processes for determining activity information relating to a group of devices, according to one embodiment.
Figure 6B:
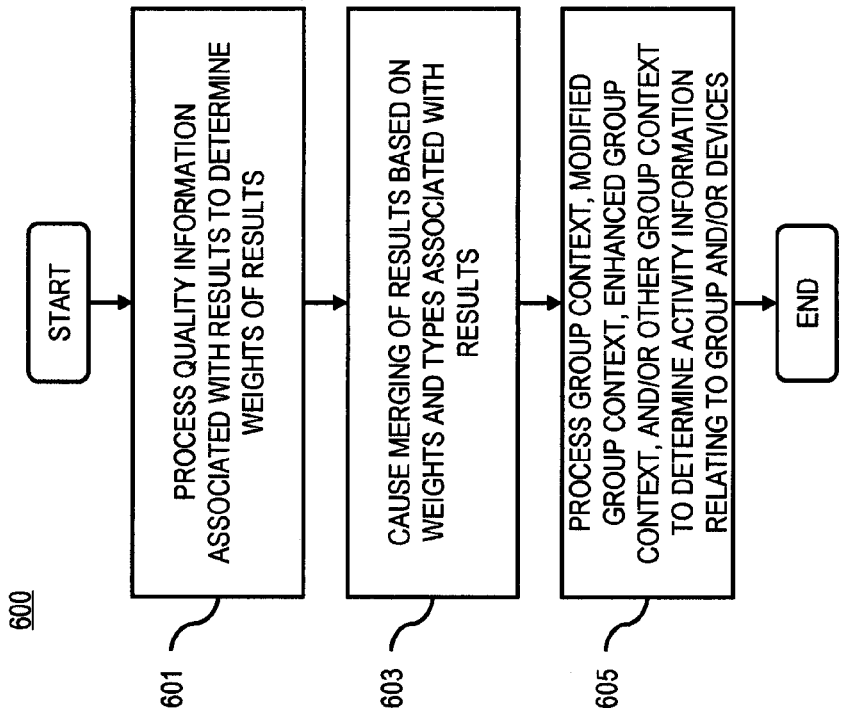

FIGS. 6A and 6B are flowcharts of processes for determining activity information relating to a group of devices, according to one embodiment. For example, FIG. 6A is a flowchart of a process for determining the activity information based on a merging approach. In one embodiment, the group context platform 103 performs the process 600 and is implemented in, for instance, a chip set including a processor and a memory as shown in FIG. 10. As such, the control logic 201 can provide means for accomplishing various parts of the process 600 as well as means for accomplishing other processes in conjunction with other components of the group context platform 103.

In step 601, the control logic 201 may process and/or facilitate a processing of quality information associated with the one or more results to determine one or more weights of the one or more results. In step 603, the control logic 201 may cause, at least in part, a merging of the one or more results based, at least in part, on the one or more weights and one or more types associated with the one or more results. As an example, certain results of the same context data type may be merged to produce more accurate group context data based on weights assigned to those results (e.g., an ambient sound signal derived from the merging of a series of sound signals). As indicated, the weight may be assigned according to the quality of the results. High quality context data may, for instance, be assigned higher weight, while lower quality context data may be assigned lower weight.

In step 605, the control logic 201 may process and/or facilitate a processing of the one or more group contexts, the one or more modified group contexts, the one or more enhanced group contexts, the one or more other group contexts, or a combination thereof to determine activity information relating to the at least one group, the one or more devices, or a combination thereof. Thus, because the merged results are utilized for the various group contexts, the activity information is based on the merging of the one or more results.

FIG. 6B is a flowchart of a process for determining the activity information based on a voting approach. In one embodiment, the group context platform 103 performs the process 630 and is implemented in, for instance, a chip set including a processor and a memory as shown in FIG. 10. As such, the control logic 201 can provide means for accomplishing various parts of the process 630 as well as means for accomplishing other processes in conjunction with other components of the group context platform 103.

In step 631, the control logic 201 may determine voting information for the one or more results based, at least in part, on one or more types associated with the one or more results. By way of example, the one or more devices of the group may submit "votes" to determine what the various group contexts should be for the group. Each of the devices in the group that are equipped with GPS sensors may, for instance, submit "votes" in the form of GPS data to determine what the relative location of the group should be. In some embodiments, the control logic 201 may calculate the number of "votes" for each context data type to determine the group context (e.g., a majority of the "votes" for a particular group context may be sufficient to override other "votes" for other group contexts of the same type).

In step 633, the control logic 201 may process and/or facilitate a processing of the one or more group contexts, the one or more modified group contexts, the one or more enhanced group contexts, the one or more other group contexts, or a combination thereof to determine activity information relating to the at least one group, the one or more devices, or a combination thereof. Thus, because the voting information is utilized for the various group contexts, the activity information is based on the voting information.

Figure 7:
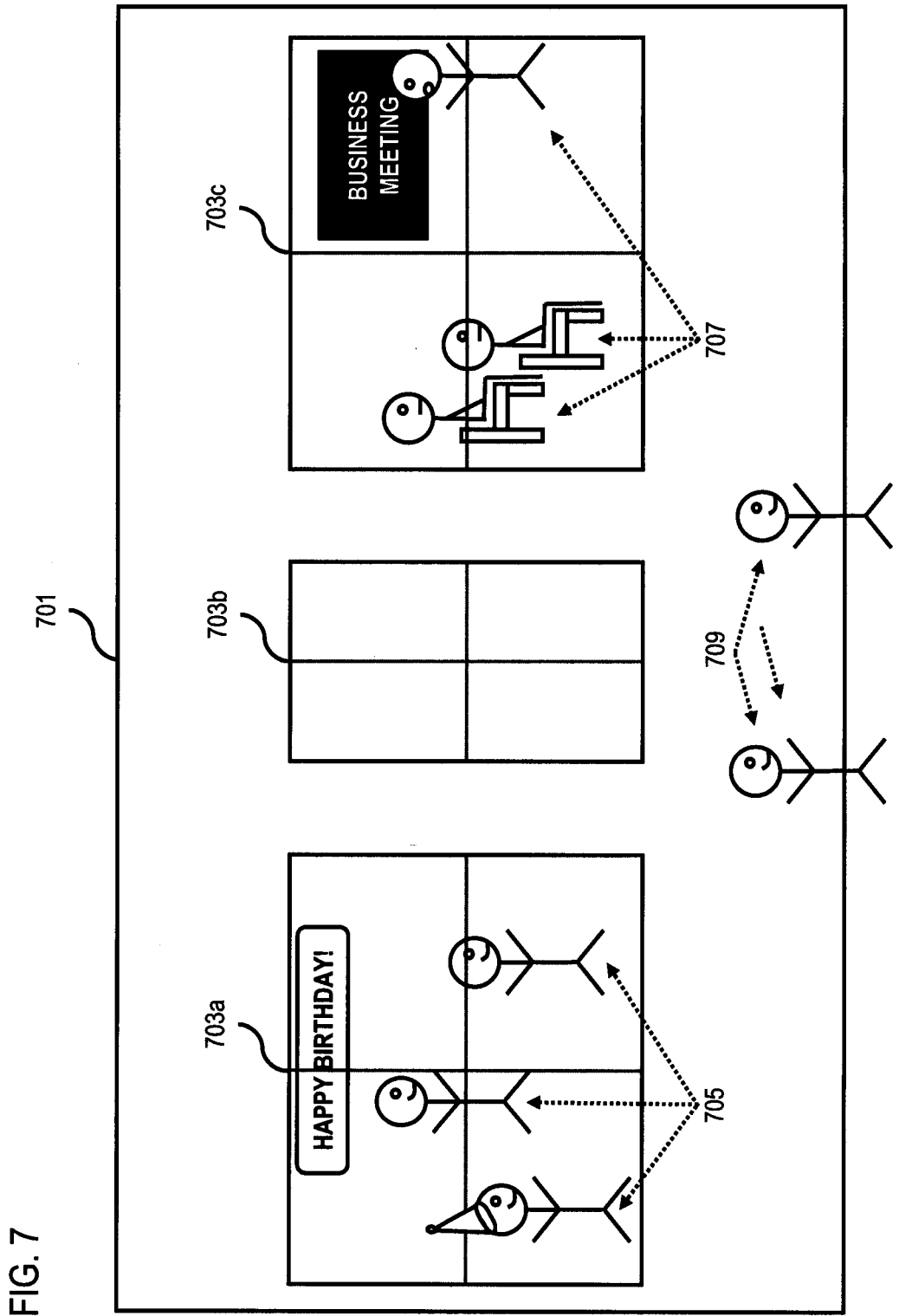
FIG. 7 is a diagram illustrating a use case for group context sensing and inference, according to one embodiment.

FIG. 7 is a diagram illustrating a use case for group context sensing and inference, according to one embodiment. As shown, a building 701 may include three rooms 703a, 703b, and 703c. Users 705 may be located in room 703a, users 707 may be located in room 703c, and users 709 may simply be walking past the building 701. Based on a combination of their respective location data, proximity data, ambient sound data, ambient light data, etc., users 705 may be determined to be in one group associated with the devices of users 705, users 707 may be determined to be in another group associated with the devices of users 707, and users 709 may be determined to be "in-between" the two groups or not currently in any particular group. As such, users 705 and 707 may be able to take advantage of group context sensing and inference based on their identified groups, while users 709 may not be able to enjoy the benefits of group context sensing and inference until their devices are determined to be part of a particular group.

In one scenario, for instance, only one of the users 705 may carry a device equipped with a microphone. Nonetheless, when all of the users say "Happy Birthday," the one device equipped with the microphone may detect the words "Happy Birthday." After collection of such ambient sound data, the group context platform 103 may utilize the ambient sound data to infer that all of the users 705 are at a birthday party. Thus, even though none of the other users 705 had devices equipped with a microphone, they were still able to benefit from one of the devices in the group being equipped with the microphone.

Figure 8B:
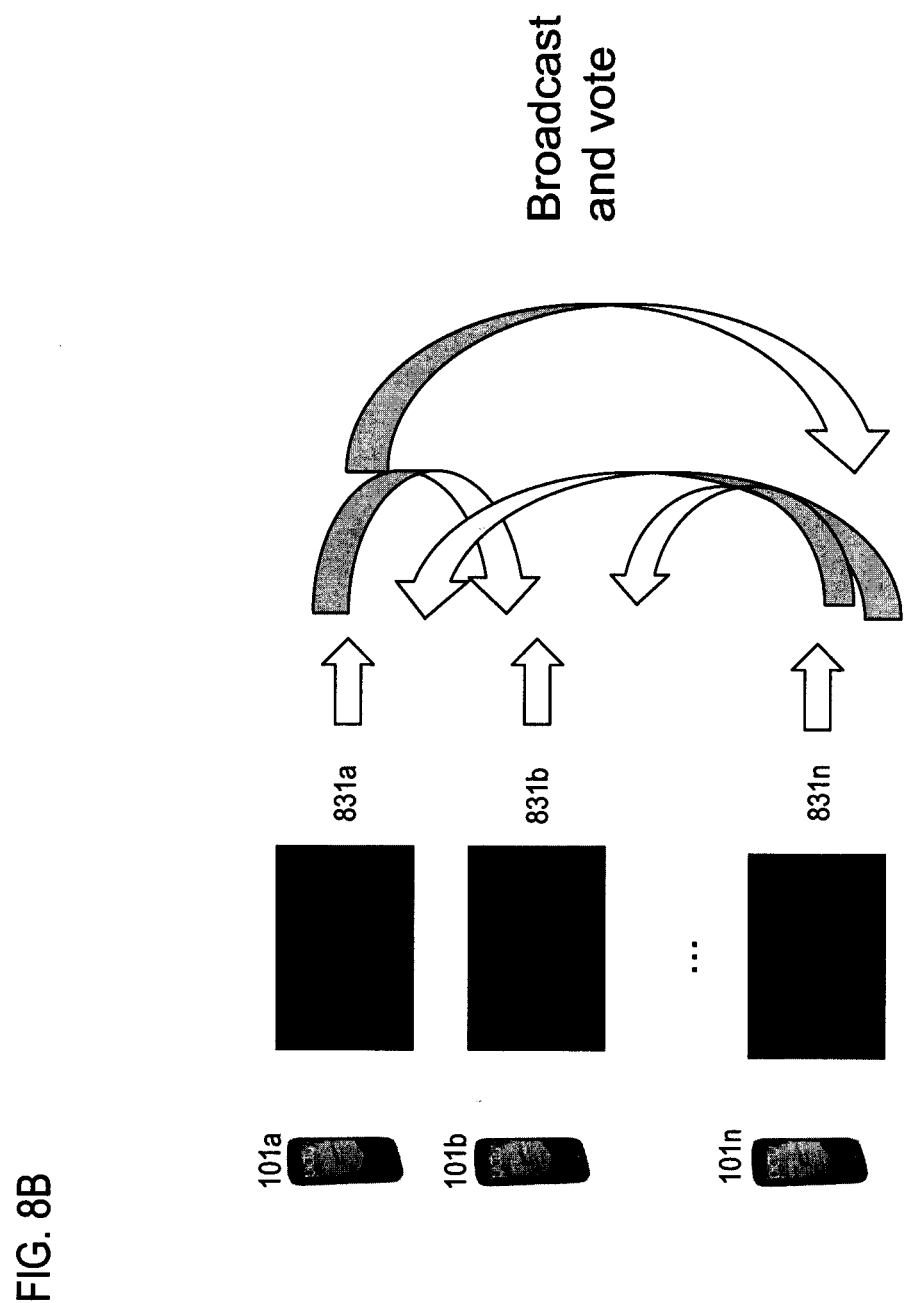

FIGS. 8A and 8B are diagrams respectively illustrating merging and voting approaches to handling results of context sensing tasks, according to one embodiment. For example, FIG. 8A illustrates merging of results based on weights associated with the results to determine various group contexts. As discussed, the same type of context data collected from multiple users in a user group (e.g., from multiple devices in the group) can be assembled to infer their common activities with higher precision. With respect to ambient sound, for instance, sound signals $801a$, $801b$, ..., $801n$ may denote n sound signal series from n user devices. All sound signal series may be received by the group context platform 103 to determine Signal $803 = \text{Avg}(w_1 * 801a, w_2 * 801b, \ldots, w_n * 801n)$, where $w_i$ denotes a weight that may be determined by the quality of each signal series. Signal 803 may thereafter be used for inferring the environment, such as a meeting, street, restaurant, etc.

FIG. 8B illustrates voting for results to determine various group contexts. As with the scenario in FIG. 8A, the same type of context data collected from multiple users in a user group (e.g., from multiple devices in the group) can be analyzed to infer their common activities with higher precision. With respect to ambient sound, for instance, sound signals $831a$, $831b$, ..., $831n$ may denote n sound signal series from n user devices. As an example, each result from each of the UEs $101a$-$101n$ of the group may be broadcasted as "votes" via NFC, Bluetooth, or other short-range wireless techniques. The group context platform 103 may calculate the "votes,"

and accept the result with the most "votes" as the correct result to be used for determining the various group contexts of the group.

The processes described herein for providing group context sensing and inference may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
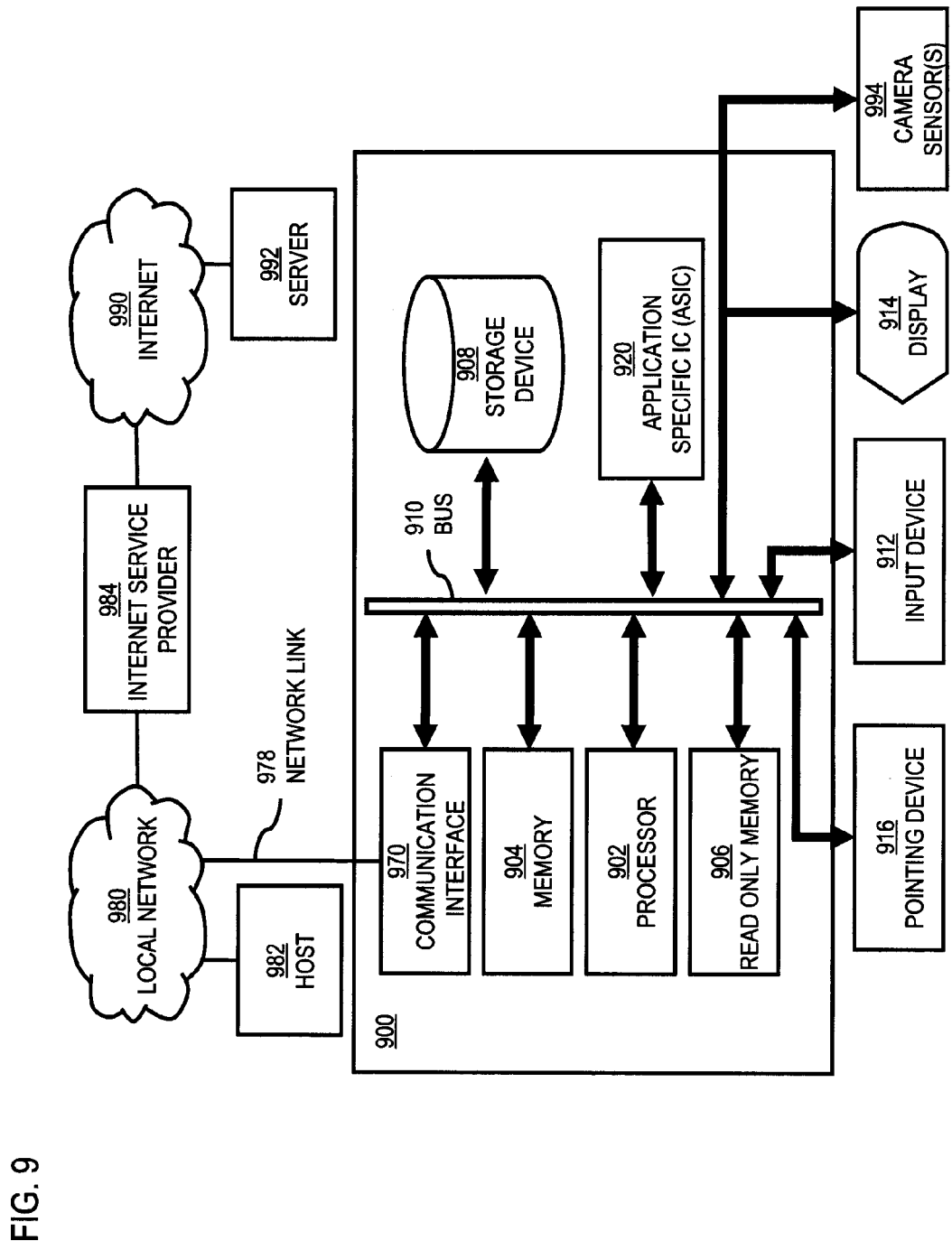
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide group context sensing and inference as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing group context sensing and inference.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to providing group context sensing and inference. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for providing group context sensing and inference. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing group context sensing and inference, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for providing group context sensing and inference to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to provide group context sensing and inference as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of providing group context sensing and inference.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide group context sensing and inference. The memory 1005 also stores the data associated with or generated by the execution of the inventive steps.

Figure 11:
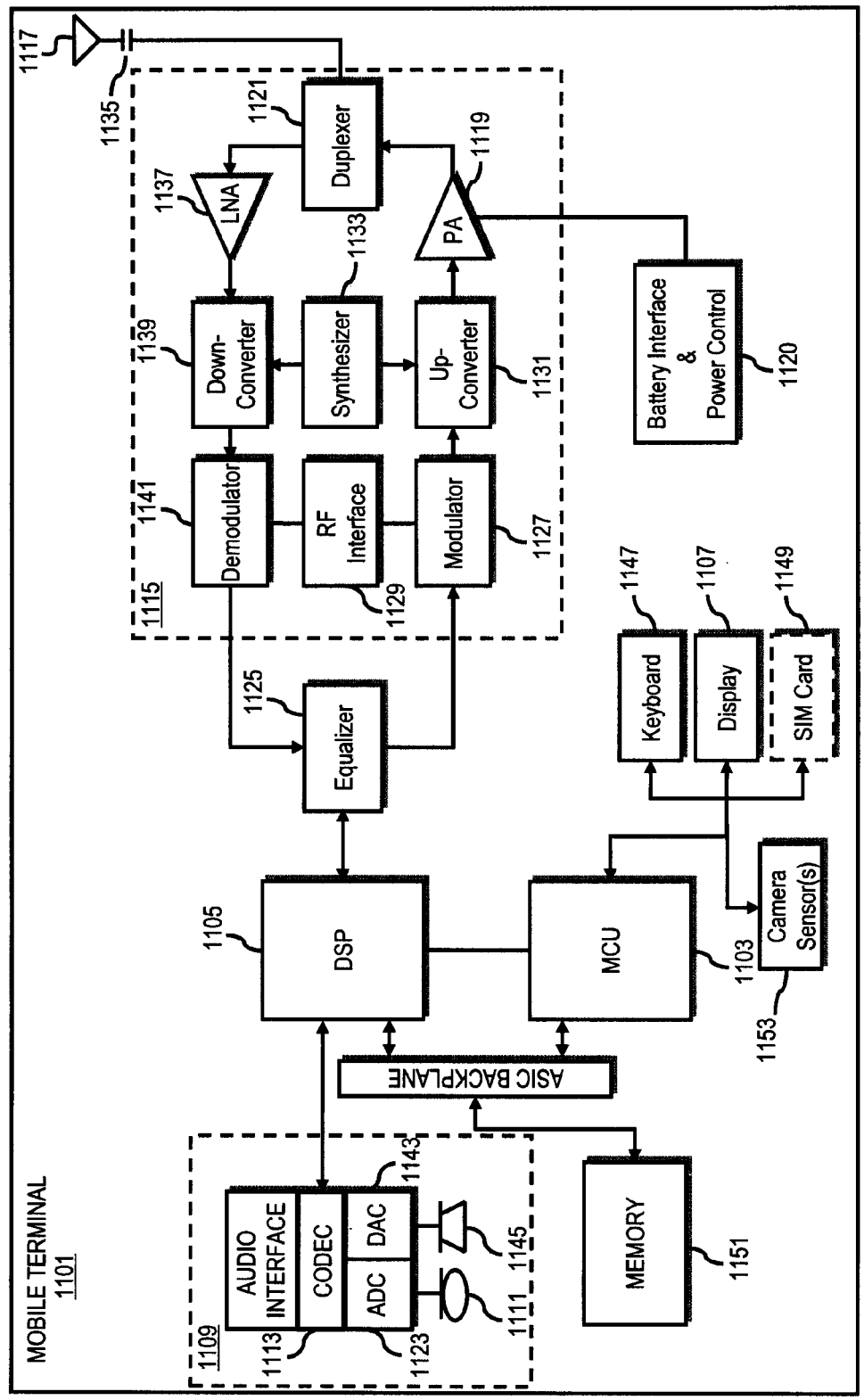
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of providing group context sensing and inference. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing group context sensing and inference. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to providing group context sensing and inference. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising;
    determining at least one group of two or more devices that have one or more group contexts that are at least substantially similar, at least substantially correlated, or a combination thereof,
    wherein the determining comprises accessing a profile database storing at least data with respect to context sensors that are available to the two or more devices, data relating to data plans available to the two or more devices, and costs associated with the data plans;
    distributing one or more context sensing tasks among the two or more devices of the at least one group based on the data with respect to context sensors that are available to the two or more devices, the data relating to data plans available to the two or more devices, and the costs associated with the data plans, wherein one of the one or more context sensing tasks is not distributed to one of the two or more devices of the at least one group; and
    processing one or more results of the one or more context sensing tasks to (a) modify the one or more group contexts; (b) enhance the one or more group contexts; (c) determine one or more other group contexts; or (d) a combination thereof.

2. A method of claim 1, further comprising:
    processing initial context data associated with the two or more devices to determine the at least one group, the one or more group contexts for determining the at least one group, or a combination thereof.

3. A method of claim 1, further comprising:
    processing the one or more group contexts, the one or more modified group contexts, the one or more enhanced group contexts, the one or more other group contexts, or a combination thereof to determine inferred context data for at least some of the two or more devices.

4. A method of claim 3, wherein the inferred context data are associated with one or more context sensors that are not available to the at least some of the two or more devices.

5. A method of claim 1, wherein at least some of the one or more context sensing tasks are heterogeneous context sensing tasks.

6. A method of claim 1, further comprising:
determining resource information, performance information, or a combination thereof associated with the two or more devices,
wherein the distribution of the one or more context sensing tasks is based on the resource information, the performance information, or a combination thereof.

7. A method of claim 6, further comprising:
assigning at least one of two or more context sensing tasks to at least one of the two or more devices, another assignment of at least another one of the two or more context sensing tasks to at least another one of the two or more devices, or a combination thereof based the resource information, the performance information, or a combination thereof,
wherein the distribution of the two more context sensing tasks is further based on the assignment, the other assignment, or a combination thereof.

8. A method of claim 1, further comprising:
processing the one or more group contexts, the one or more modified group contexts, the one or more enhanced group contexts, the one or more other group contexts, or a combination thereof to determine activity information relating to the at least one group, the two or more devices, or a combination thereof.

9. A method of claim 8, further comprising:
presenting one or more notifications, one or more recommendations, or a combination thereof for the at least one group, the two or more devices, or a combination thereof based on the activity information.

10. An apparatus comprising:
at least one processor; and
at least one memory including computer program code for one or more programs,
the at least one memory and the computer program code configured to, with the at least one processor, cause the apparatus to perform at least the following,
determine at least one group of two or more devices that have one or more group contexts that are at least substantially similar, at least substantially correlated, or a combination thereof,
wherein the determining comprises accessing a profile database storing at least data with respect to context sensors that are available to the two or more devices, data relating to data plans available to the two or more devices, and costs associated with the data plans;
distribute one or more context sensing tasks among the two or more devices of the at least one group based on the data with respect to context sensors that are available to the two or more devices, the data relating to data plans available to the two or more devices, and the costs associated with the data plans, wherein one of the one or more context sensing tasks is not distributed to one of the two or more devices of the at least one group; and
process one or more results of the one or more context sensing tasks to (a) modify the one or more group contexts; (b) enhance the one or more group contexts; (c) determine one or more other group contexts; or (d) a combination thereof.

11. An apparatus of claim 10, wherein the apparatus is further caused to:
process initial context data associated with the two or more devices to determine the at least one group, the one or more group contexts for determining the at least one group, or a combination thereof.

12. An apparatus of claim 10, wherein the apparatus is further caused to:
process the one or more group contexts, the one or more modified group contexts, the one or more enhanced group contexts, the one or more other group contexts, or a combination thereof to determine inferred context data for at least some of the two or more devices.

13. An apparatus of claim 12, wherein the inferred context data are associated with one or more context sensors that are not available to the at least some of the two or more devices.

14. An apparatus of claim 10, wherein at least some of the one or more context sensing tasks are heterogeneous context sensing tasks.

15. An apparatus of claim 10, wherein the apparatus is further caused to:
determine resource information, performance information, or a combination thereof associated with the two or more devices,
wherein the distribution of the one or more context sensing tasks is based on the resource information, the performance information, or a combination thereof.

16. An apparatus of claim 15, wherein the apparatus is further caused to:
assign at least one of two or more context sensing tasks to at least one of the two or more devices, another assignment of at least another one of the two or more context sensing tasks to at least another one of the two or more devices, or a combination thereof based on the resource information, the performance information, or a combination thereof,
wherein the distribution of the two or more context sensing tasks is further based on the assignment, the other assignment, or a combination thereof.

17. An apparatus of claim 10, wherein the apparatus is further caused to:
process the one or more group contexts, the one or more modified group contexts, the one or more enhanced group contexts, the one or more other group contexts, or a combination thereof to determine activity information relating to the at least one group, the two or more devices, or a combination thereof.

18. An apparatus of claim 17, wherein the apparatus is further caused to:
present one or more notifications, one or more recommendations, or a combination thereof for the at least one group, the two or more devices, or a combination thereof based on the activity information.

19. A non-transitory computer-readable storage medium carrying one or more sequences of one or more instructions which, when executed by one or more processors, cause an apparatus to at least perform the steps:
determining at least one group of two or more devices that have one or more group contexts that are at least substantially similar, at least substantially correlated, or a combination thereof,
wherein the determining comprises accessing a profile database storing at least data with respect to context sensors that are available to the two or more devices, data relating to data plans available to the two or more devices, and costs associated with the data plans;

distributing one or more context sensing tasks among the two or more devices of the at least one group based on the data with respect to context sensors that are available to the two or more devices, the data relating to data plans available to the two or more devices, and the costs associated with the data plans, wherein one of the one or more context sensing tasks is not distributed to one of the two or more devices of the at least one group; and processing one or more results of the one or more context sensing tasks to (a) modify the one or more group contexts; (b) enhance the one or more group contexts; (c) determine one or more other group contexts; or (d) a combination thereof.

20. A non-transitory computer-readable storage medium of claim 19, wherein the apparatus is caused to further perform:

processing initial context data associated with the two or more devices to determine the at least one group, the one or more group contexts for determining the at least one group, or a combination thereof.

\* \* \* \* \*